(12) United States Patent
Son et al.

(10) Patent No.: US 9,942,092 B2
(45) Date of Patent: *Apr. 10, 2018

(54) METHOD AND AN APPARATUS FOR CONTROLLING MESSAGES BETWEEN HOST AND CONTROLLER

(71) Applicant: LG ELECTRONICS INC., Seoul (KR)

(72) Inventors: Juhyung Son, Seoul (KR); Seunghyup Ryoo, Seoul (KR); Jaejoon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/421,042

(22) Filed: Jan. 31, 2017

(65) Prior Publication Data

US 2017/0141960 A1    May 18, 2017

Related U.S. Application Data

(63) Continuation of application No. 15/059,980, filed on Mar. 3, 2016, now Pat. No. 9,590,851, which is a continuation of application No. 13/054,260, filed as application No. PCT/KR2009/003978 on Jul. 17, 2009, now Pat. No. 9,319,492.

(60) Provisional application No. 61/117,243, filed on Nov. 24, 2008, provisional application No. 61/094,982, filed on Sep. 8, 2008, provisional application No.
(Continued)

(51) Int. Cl.
*H04L 12/24* (2006.01)
*H04L 29/06* (2006.01)

(52) U.S. Cl.
CPC .......... *H04L 41/0813* (2013.01); *H04L 69/28* (2013.01)

(58) Field of Classification Search
None
See application file for complete search history.

(56) References Cited

U.S. PATENT DOCUMENTS 6,979,997 B1   12/2005  Myers
8,203,426 B1    6/2012  Hirschfeld et al.
(Continued)

FOREIGN PATENT DOCUMENTS

CN          1708044 A    12/2005
CN        101119522 A     2/2006
(Continued)

*Primary Examiner* — Hsin-Chun Liao
(74) *Attorney, Agent, or Firm* — Birch, Stewart, Kolasch & Birch, LLP

(57) ABSTRACT

A method of controlling at least one message including at east one command and response, the method includes transmitting a reset command to reset a receiver, wherein a parameter of the receiver is reset to a default value based on the reset command; transmitting a set command including parameter information to the receiver for setting a parameter of the receiver with a target value; and receiving a set command response including first status information in response to the set command, wherein the first status information indicates whether a parameter requested by the set command is set to a target value or not, and wherein if the parameter requested by the set command is set to a target value, the first status information indicates a field of STATUS_OK and if the parameter requested by the set command is not set to a target value, the first status information indicates a field of STATUS_INVALID_PARAM.

8 Claims, 5 Drawing Sheets

Related U.S. Application Data

61/093,359, filed on Sep. 1, 2008, provisional application No. 61/081,739, filed on Jul. 18, 2008.

(56) References Cited

U.S. PATENT DOCUMENTS

| | | |
|---|---|---|
| 2003/0060946 A1 | 3/2003 | Okuyama et al. |
| 2004/0073939 A1 | 4/2004 | Ayyagari |
| 2004/0158333 A1 | 8/2004 | Ha et al. |
| 2005/0093770 A1 | 5/2005 | De Bonet et al. |
| 2006/0180666 A1 | 8/2006 | Yamashita et al. |
| 2006/0259663 A1 | 11/2006 | Castille et al. |
| 2007/0002675 A1 | 1/2007 | Koo |
| 2007/0080203 A1 | 4/2007 | Iwata et al. |
| 2007/0276935 A1 | 11/2007 | Liu |
| 2008/0126554 A1 | 5/2008 | Sakai et al. |
| 2008/0133065 A1 | 6/2008 | Cannon et al. |

FOREIGN PATENT DOCUMENTS

| | | |
|---|---|---|
| EP | 1 809 056 A2 | 7/2007 |
| WO | WO 2007/052994 A1 | 5/2007 |
| WO | WO 2008/065232 A1 | 6/2008 |
| WO | WO 2008/071925 A1 | 6/2008 |

[Fig. 1]
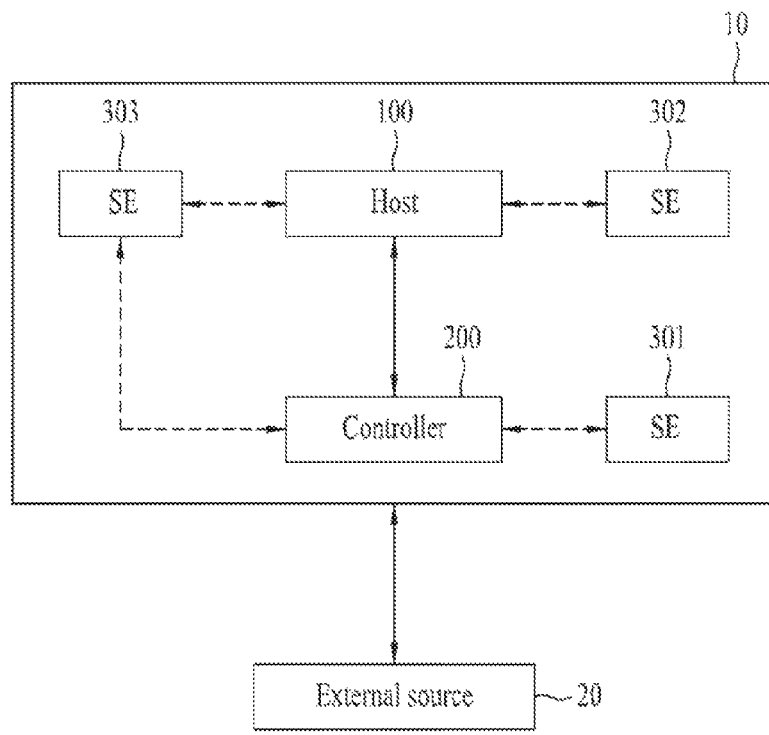
[Fig. 2]
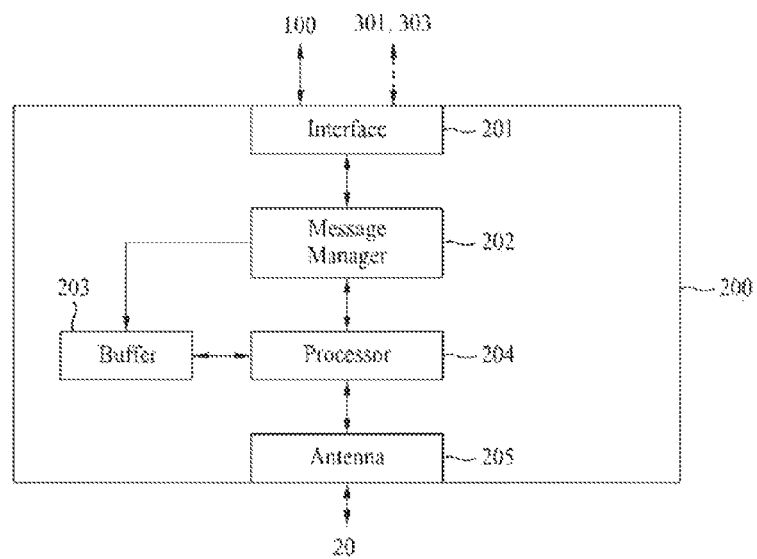

[Fig. 3]
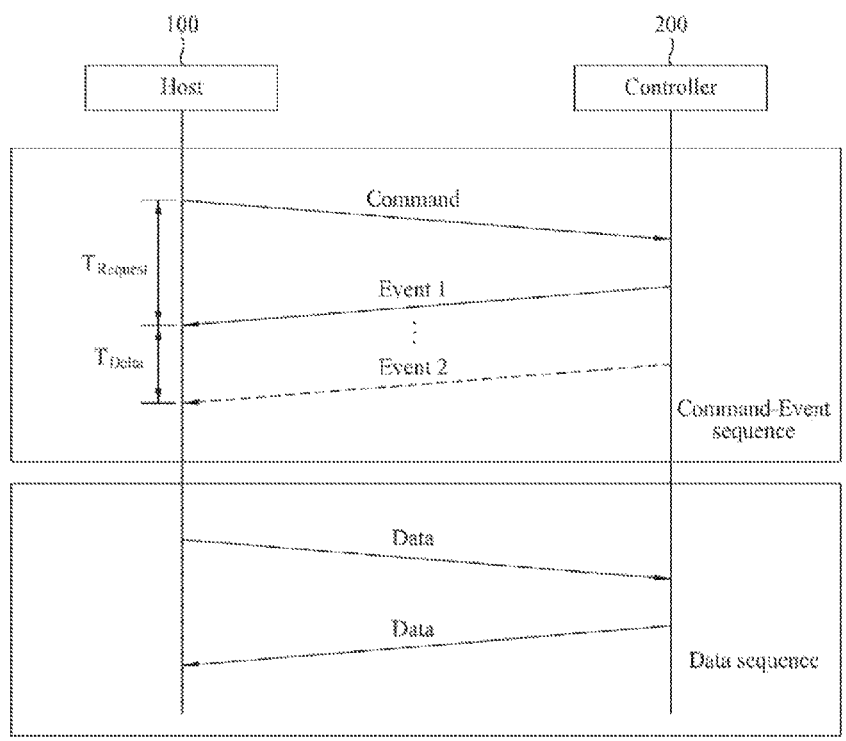

[Fig. 4]
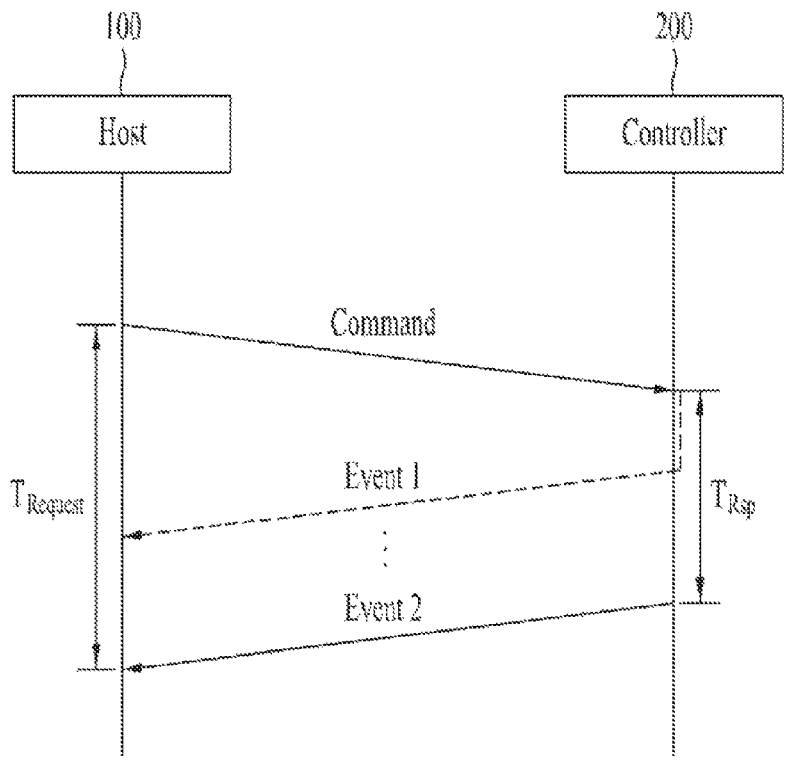
[Fig. 5]
| Transaction Identifier | Definition |
|---|---|
| 0xxxxxxxb | MSBit=0, Transaction initiated by Host |
| 1xxxxxxxb | MSBit=1, Transaction initiated by Controller |
| 00000000b | reserved |
| 11111111b | TRANS_ID_UNUSED: this transaction identifier is used for Events which are not triggered by any Command. |

[Fig. 6]

| Command | GID | OID | Param length | Parameters |
|---|---|---|---|---|
| NCI_CORE_GET_CONFIG_CMD | 0000b | 0x01 | 0x01 + n*4 | Transaction Identifier (1 octet)<br>Parameter_ID_1 (4 octet)<br>...<br>Parameter_ID_n (4 octet) |

| Command | GID | OID | Param length | Parameters |
|---|---|---|---|---|
| NCI_CORE_GET_CONFIG_EVENT | 0000b | 0x02 | 0x02 + n*(6+x) | Transaction Identifier (1 octet)<br>Status (1 octet)<br>Parameter_ID_1 (4 octets)<br>Parameter_Len_1 (2 octets)<br>Parameter_Val_1 (x octet)<br>...<br>Parameter_ID_n (4 octet)<br>Parameter_Len_n (2 octets)<br>Parameter_Val_n (x octet) |

[Fig. 7]

| Command | GID | OID | Param length | Parameters |
|---|---|---|---|---|
| NCI_CORE_SET_CONFIG_CMD | 0000b | 0x03 | 0x01 + n*(6+x) | Transaction Identifier (1 octet)<br>Parameter_ID_1 (4 octets)<br>Parameter_Len_1 (2 octets)<br>Parameter_Val_1 (x octet)<br>...<br>Parameter_ID_n (4 octet)<br>Parameter_Len_n (2 octets)<br>Parameter_Val_n (x octet) |

| Command | GID | OID | Param length | Parameters |
|---|---|---|---|---|
| NCI_CORE_SET_CONFIG_EVENT | 0000b | 0x04 | 0x02 | Transaction Identifier (1 octet)<br>Status (1 octet) |

[Fig. 8]

| Parameter | Size | Value | Description |
|---|---|---|---|
| Status | 1B | 0x00 | No Error |
| | | TBD | Unknown NCI Command |
| | | TBD | Hardware Failure |
| | | TBD | Buffer Overflow |
| | | TBD | Invalid Parameter |
| | | TBD | Access Failure |
| | | TBD | Access Denied |
| | | TBD | CON Create Request OK |
| | | TBD | CON Create Request Reject |
| | | TBD | CON Create Successful |
| | | TBD | CON Create Failure |
| | | TBD | CON Close Request OK |
| | | TBD | CON Close Request Reject |
| | | TBD | CON Close Successful |
| | | TBD | CON Close Failure |
| | | TBD | NFCC Error |
| | | Others | RFU |

TBD : To be Defined
RFU : Reserved for Future Usage

METHOD AND AN APPARATUS FOR CONTROLLING MESSAGES BETWEEN HOST AND CONTROLLER

CROSS-REFERENCE TO RELATED APPLICATIONS

This Application is a Continuation of co-pending U.S. patent application Ser. No. 15/059,980 filed on Mar. 3, 2016, which is a Continuation of U.S. patent application Ser. No. 13/054,260 filed on Jan. 14, 2011 (now U.S. Pat. No. 9,319,492 issued on Apr. 19, 2016), which is filed as the National Phase of PCT/KR2009/003978 filed on Jul. 17, 2009 which claims the benefit under 35 U.S.C. § 119(e) to U.S. Provisional Application Nos. 61/117,243 filed on Nov. 24, 2008, 61/094,982 filed on Sep. 8, 2008, 61/093,359 filed on Sep. 1, 2008. and 61/081,739 filed on Jul. 18, 2008, all of which are hereby expressly incorporated by reference into the present application.

BACKGROUND OF THE INVENTION

Field of the Invention

The present invention relates to a method and apparatus for controlling messages between a host and a controller, and more particularly, to an interface environment. for message transmission.

Discussion of the Related Art

Recently, a Near Field Communication (NFC) concept as a substitute for wired communication or infrared communication has been introduced to the market. As a result, high-speed data communication can be achieved among a plurality of electronic appliances using a radio frequency instead of a physical cable. In addition, data communication is wirelessly achieved among a plurality of electronic devices, such that there is no need to connect a cable to any devices (for example, a digital camera, a printer, and the like). Based on the above-mentioned Radio Frequency (RF) communication, not only text data but also voice data can be communicated among a plurality of electronic devices.

SUMMARY OF THE INVENTION

An object of the present invention devised to solve the problem lies on increasing a message transmission rate by ensuring the reliability of message exchange, accurately identifying a message sender, and ensuring compatibility with a plurality of communication protocols for communications with various external communication devices, during communications in radio frequencies.

In one aspect of present invention, message controlling method includes transmitting a command from a sender to a receiver, transmitting an initial response indicating acknowledgement for receiving the command from the receiver to the sender and transmitting a subsequent response being after the initial response as one of a plurality of responses corresponding to the command from the receiver to the sender.

The subsequent response may include final response indicating completion of processing the command from the receiver to the sender.

And, the method is defined with a total time required for the final response corresponding to the command to be arrived at the sender after the sender sends the command to the receiver, and the method is defined with a total time required tier the receiver to process the command to send the final response corresponding to the command.

And, the transmitting method is defined with a time interval the sender waits for the initial response after the sender sends the command. And, the transmitting method is defined with a time interval the sender waits for the final response after the sender receives the initial response.

In another aspect of present invention, message controlling method includes transmitting a command to a receiver, receiving an initial response indicating acknowledgement for receiving the command from the receiver and receiving a subsequent response being after the initial response as one of a plurality of responses corresponding to the command from the receiver.

In another aspect of present invention, message controlling method includes receiving a command from a sender, transmitting an initial response indicating acknowledgement for receiving the command to the sender and transmitting a subsequent response being after the initial response as one of a plurality of responses corresponding to the command to the sender.

In one aspect of present invention, message controlling apparatus includes a controller configured to transmit an initial response indicating acknowledgement corresponding to the command originated from a host, and transmit a subsequent response being after the initial response as one of a plurality of responses corresponding to the command.

In another aspect of present invention, message controlling apparatus includes a controller configured to transmit multiple responses corresponding to a command which is transmitted along with an identifier identifying the command sender, the multiple responses having an identifier same with the identifier transmitted from the command sender. In another aspect of present invention, message controlling apparatus includes a controller configured to transmit a get command response corresponding to a get command including a parameter identifier for retrieving a parameter value of the controller, the get command response transmitting a retrieved value corresponding to the parameter, and the controller is configured to transmit a set command response corresponding to a set command including a parameter identifier to the controller for setting a parameter of the controller with a target value.

The present invention ensures the reliability of a message exchange by immediately notifying the other entity of a transmission result during the message exchange between a host and a controller.

The present invention also reduces errors in processing a command through accurate identification of a message sender.

Finally, the present invention enables compatibility with a plurality of communication protocols during communication with various external communication devices.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 is a block diagram of an overall system according to the present invention.

FIG. 2 is a block diagram of a controller illustrated in FIG. 1.

FIG. 3 is a flowchart illustrating a message transmission and reception. sequence between a host and the controller according to an exemplary embodiment of the present invention.

FIG. 4 is a flowchart illustrating a message transmission and reception sequence between the host and the controller according to another exemplary embodiment of the present invention.

FIG. 5 illustrates a table that defines Transaction Identifier for identifying a command sender, when a command is transmitted and received between the host and the controller.

FIGS. 6 and 7 illustrate tables that list parameters used for transmission and reception of a command between the host and the controller.

FIG. 8 illustrates a table that specifies Status, one of the parameters listed in FIGS. 6 and 7.

DETAILED DESCRIPTION OF THE INVENTION

Reference will now be made in detail to the preferred embodiments of the present invention, examples of which are illustrated in the accompanying drawings.

Although most terms used in the present invention have been selected from general ones widely used in the art, some terms have been arbitrarily selected by the applicant and their meanings are explained in detail in the following description as needed. Thus, the present invention should be understood with the intended meanings of the terms rather than their simple names and meanings.

Wherever possible, the same reference numbers will be used throughout the drawings to refer to the same or like.

Now, embodiments of the present invention will be described in detail with reference to the accompanying drawings so that the present invention will be easily understood and realized by those skilled in the art.

FIG. 1 is a block diagram of an overall system according to the present invention. The following description is made in the context of Near Field Communication (NFC), a short-range wireless connectivity technology that enables simple and safe two-way interactions between electronic devices, by way of example, to which the present invention is not limited.

Referring to FIG. 1, an overall system under the NFC environment may include an NEC device 10 and an external source 20. The NFC device 10 may include a host 100 for controlling a controller 200 and Secure Elements (SEs) 301, 302 and 303, the controller 200 for controlling for communications between the NFC device 10 and the external source 20 under the NEC environment, and the SEs 301, 302 and 303 such as Universal Subscriber Identify Module (USIM) chips, for communicating with the host 100 as well as the controller 200. The NEC device 10 may be an NEC phone or an NFC TV for example. The external source 20 communicates with the NEC device 10 through the controller 200 in the NFC environment. The external source 20 may include a reader of a transportation card or an access control system, or tag information of a smart poster.

FIG. 2 is a block diagram of the controller 200 illustrated in FIG. 1. Referring to FIG, 2, the controller 200 may include an interface 201, a message manager 202, a butler 203, a processor 204, and an antenna 205.

The interface 201 is defined as a logical and physical connection path between the controller 200 and the host 100 or between the controller 200 and the SEs 301, 302 and 303. Especially in an exemplary embodiment of the present invention, the interface 201 may be defined as a connection path between the host 100 and the controller 200 under the NFC environment, called an NEC I-lost Controller interface (NCI). The interface 201 may be configured in a different manner depending on whether the controller 200 is connected only to the host 100 (single-host architecture) or it is connected to other components such as SEs in addition to the host 100 (multi-host architecture). Although the scope of the NCI does not change, the NCI needs to support additional features in the multi-host architecture, compared to the single-host architecture. Therefore, a required NCI functionality is different in a single- or multi-host environment. While the interface 201 is included in the controller 200 in the exemplary embodiment of the present invention, it may be incorporated into the host 100 or into both the controller 200 and the host 100.

The interface 201 transmits a signal received from the host 100 to a component of the controller 200 or a processed signal received from the component to the host 100. To be more specific, the interface 201 receives a command from the host 100 and transmits the command to the message manager 202. The interface 201 also receives a response to the command from the message manager 202 and transmits the response to the host 100. In the present invention, a message conceptually covers a command and a response. Especially a message flow in the scope of the NCI, i.e. the interface 201 is described.

The message manager 202 generates the response based on the command received from the interface 201. The response may include an initial response indicating an acknowledgment for receiving the command originated from the host 100 or a subsequent response as one of a plurality of responses generated after an initial response to the command. While it has been described that the controller 200 receives a command in the exemplary embodiment of the present invention, it may be further contemplated that the controller 200 transmits a command to the host 100 and the host 100 generates a response to the command. In this case, the message manager 202 generates the command.

Multiple responses may be generated for the command, along with an identifier that identifies the sender. The message manager 202 may generate an identifier identical to an identifier of the command originated from the host 100. As described above, when the controller 200 generates a command and transmits, it to the host 100, the message manager 202 may be responsible for generating the identifier of the command.

Besides, the message manager 202 may generate a get command response and a set command response respectively for a get command and a set command received from the host 100. The get command response is to a get command including a parameter identifier for retrieving a parameter value of the controller 200. The get command response has a retrieved value corresponding to the parameter. The set command response is to a set command including a parameter identifier for setting a parameter of the controller 200 to a target value.

The buffer 203 buffers the command originated from the host 100 and the response generated from the message manager 202 and transmits the command and the response to the processor 204.

The processor 204 executes the command received from the buffer 203. The message manager 202 monitors the execution status of the processor 204 and generates the afore-described initial response or subsequent response according to the execution status. Also, the message manager 202 generates identifiers for multiple responses, a get command response, and a set command response.

The antenna 205 takes charge of interfacing between the controller 200 and the external source 20, for NFC. The antenna 205 is used for RF transmission and reception. FIG. 3 is a flowchart illustrating a message transmission and reception sequence between the host 100 and the controller 200 according to an exemplary embodiment of the present invention.

Referring to FIG. 3, a message covers a command, an event as a response to. the command, and data. A command-event sequence is illustrated in the upper part of FIG. 3, under which a data sequence is illustrated.

The command-event sequence is based on commands and events. The host 100 may transmit a command to the controller 200 to instruct the controller 200 to perform a specific action. The command may be answered with at least one event.

In FIG. 3, the host 100 transmits a command to the controller 200 and the controller 200 replies to the host 100 with a first event (Event 1) and a second event (Event 2) as responses to the command. Event 1 indicates acknowledgement for receiving the command. And, after the event 1, there is a plurality of responses corresponding to the command as subsequent responses. Event 2 is one of the subsequent responses and especially may be a final response indicating completion of processing the command from the controller 200. In FIG. 3, Event 1 may be implemented as mandatory and Event 2 may be implemented as optional, however, it may be possible implementing Event 1 as optional and Event 2 as mandatory as disclosed in FIG. 4. In other words, Event 1 and Event 2 may be implemented as mandatory or optional responses to the command.

For example, the host 100 uses a command NCI_CORE_RESET_CMD to reset the controller 200. This command can be issued any time after power-up of the controller 200. And. the controller 200 transmits an event NCI_CORE_RESET_RESP_EVENT to inform the host 100 that the controller 200 has received the command. An event NCI_CORE_RESET_COMPLETE EVENT is used to inform the host 100 that the controller 200 has been reset.

The controller 200 is compatible with a plurality of communication protocols such as ISO 14443-A and B, ISO 18092, FeliCa, etc. A time required for searching for an external communication device, i.e. the external source 20 may differ with protocols and be difficult to estimate. Therefore, if a long time is taken to execute the command, Event 1 may be first transmitted as an acknowledgement response and a final response may be transmitted later, so as to render the resource status of the host 100 free.

An event may also be transmitted independently of any command. The host 100 may not response to a command for its power management reasons.

A time required for the message sequence between the host 100 and the controller 200 may be defined as $T_{Request}$ and $T_{Delta}$, as illustrated in FIG. 3. $T_{Request}$ is a time interval the host 100 waits for Event I after it transmits the command and $T_{Delta}$ is a time interval the host 100 waits for the subsequent response after it receives Event 1. $T_{Delta}$ may be especially defined as a time interval the host 100 waits for Event 2 after it receives Event 1. In the exemplary embodiment of the present invention illustrated in FIG. 3, the times have been set from the perspective of the host 100 only. The time setting from the perspective of the sender shortens a time delay, thus increasing efficiency, compared to time setting from the perspective of the receiver.

$T_{Delta}$, is used only for a command that has more than one event. At the moment, it may be assumed that for any particular command, there will be only a maximum of two events. Nevertheless, if there are commands that require more than one additional event, then, another $T_{Delta}$ time will be used for every additional event. And a command is considered to be complete when all the command-specific events are received or when there occurs a timeout on $T_{Request}$ or $T_{Delta}$) as per the case.

While it has been described that the host 100 transmits a command to the controller 200 in the exemplary embodiment of the present invention, it is to be clearly understood that the above-described message sequence and the same definitions of $T_{Request}$ and $T_{Delta}$ are also applicable to the case where the controller 200 transmits a command to the host 100.

According to the data sequence illustrated in the lower part of FIG. 3, the host 100 can transmit data to the controller 200 or vice versa. The data sender, i.e. the host 100 may not require an acknowledgment from the receiver, i.e. the controller 200. Flow control mechanisms may be used during data exchange to handle buffer overflow conditions. If the controller 200 that has received a command cannot perform the requested action, it may inform the host 100 of the failure using an event status as NCI_STATUS_REJECTED. Reasons for not being able to perform the command could he overflow, limited processing power, and limited resources. A timeout may happen during the NCI scope message sequence if an event doesn't come for the command within the specified $T_{Request}$ or $T_{Delta}$. In such a case, the command may be considered complete and the sender may retransmit the command.

FIG. 4 is a flowchart illustrating a message transmission and reception. sequence between the host 100 and the controller 200 according to another exemplary embodiment of the present invention.

Description for Event 1 and Event 2 is also applicable far FIG. 4. However, in FIG. 4, Event 1 may be implemented as optional and Event 2 may be implemented as mandatory unlike FIG. 3. As stated above, Event 1 and. Event 2 may be implemented as mandatory or optional responses to the command.

Unlike the exemplary embodiment illustrated in FIG. 3, times are set from the perspective of both the host 100 and the controller 200 in the exemplary embodiment of FIG. 4. For example, the message sequence between the host 100 and the controller 200 may be defined with $T_{Request}$ which is required for the subsequent response, especially the final response, Event 2 corresponding to the command to arrive at the host 100 after the host 100 transmits the command to the controller 200. The message sequence between the host 100 and the controller 200 may also be defined with $T_{Rsp}$ which is required for the controller 200 to process the command to transmit the subsequent response, especially the final response, Event 2.

$T_{Request}$ and $T_{Rsp}$ may be set as upper-bound timing guidelines, which is efficient. That is, the implementation is bound to meet the timings and thus indefinite waiting at the host 100 for a command or a response is avoided. An operation speed in a transport layer, the speed of a physical transport bus, a processing time at the side of the host 100 or the controller 200. and the type of an NCI command may affect a timely response from the host 100. Therefore, there are also relevant aspects to determine the $T_{Request}$ and $T_{Rsp}$ timings.

FIG. 5 illustrates a table that defines Transaction Identifier for identifying a command sender, when a command is transmitted and received between the host 100 and the controller 200.

Referring to FIG. 5, a transaction is identified with Transaction Identifier which is one of parameters. The transaction is started with a command and ended when this command is completed. The concept of the transaction is applicable to commands and events having the parameter, Transaction Identifier.

At least one event corresponding to a response of a command may have the same Transaction Identifier of the command which it belongs to. For example, the Transaction Identifier of a command is set to 0xxxxxxxb, as illustrated in FIG. 5, the Transaction Identifier of an event corresponding to a response for the command is also set to the same value 0xxxxxxxb.

The Transaction Identifier value may not be reused as long as the transaction is not completed. For example, if the Transaction Identifier of a command is set to 0xxxxx11b, the Transaction Identifier of another command created before completion of the transaction should not be set to 0xxxxx11b. To prevent the Transaction Identifier of a command from coinciding with that of another command that occurs before the transaction of the command is completed, the value of Transaction Identifier for commands may be set to automatically increment sequentially.

As illustrated in FIG. 5. if the host 100 initiates a transaction, a Transaction Identifier with a Most Significant Bit (MSB) set to 0 may be set. If the controller 200 initiates a transaction, a Transaction Identifier with an MSB set to 1 may be set. The transaction initiators may be identified by different MSBs. If an event is generated independently of a command, not an event being a response for a command, the Transaction Identifier is set to 11111111b, to thereby indicate the status of the transaction.

FIGS. 6 and 7 illustrate tables that list parameters used for transmission and reception of a command between the host 100 and the controller 200.

Referring to FIGS. 6 and 7, both the host 100 and the controller 200 may have parameters to be aware of and/or modify the device settings of the other entity. One of the parameters. "Param length" indicates the length of the parameters. As stated before, since the controller 200 is compatible with a plurality of protocols such as ISO 14443-A and B, ISO 18092, FeliCa, etc, when it communicates with the external source 20, it transmits parameters associated with a protocol of the external source 20 to communicate with, along with a command, Hence, a protocol of a device to communicate with can be set. An identifier of the message is indicated in an Opcode Identifier (OID) field identifying an opcode meaning a command from the Host 100, The OID may be unique inside a group which is indicated by a Group Identifier (GID) field.

The host 100 can retrieve or set the parameters for the controller 100, or the controller 200 can retrieve or set the parameters on the host 100 by commands, NCI_CORE_GET_CONFIG_CMD or NCI_CORE_SET_CONFIG_CMD illustrated in FIGS. 6 and 7.

The host 100 may use NCI_CORE_GET_CONFIG_CMD to understand configurations set in the controller 200. In other words, for retrieving the parameters, the host 100 may transmit the command along with an appropriate "Parameter_ID" to the controller 200. A response to NCI_CORE_GET_CONFIG_CMD comes in the form of NCI_CORE_GET_CONFIG_EVENT. In other words, upon successful reception and execution, the controller 200 may transmit the event along with an appropriate "Parameter_ID" and current parameter values set in the controller 200.

For example, as illustrated in FIG. 6, when the host 100 transmits a parameter, Parameter_ID_1 (4 octet) in NCI_CORE_GET_CONFIG_CMD to the controller 200, the controller 200 transmits a value, Parameter_Val_1 (x octet) corresponding to Parameter_ID_1 (4 octet) together with Parameter_ID_1 (4 octet) in NCI_CORE_GET_CONFIG_EVENT. The controller 200 may also transmit length information in NCI_CORE_GET_CONFIG_EVENT. When the host 100 transmits a parameter, Parameter_ID_n (4 octet) in NCI_CORE_GET_CONFIG_CMD to the controller 200, the controller 200 transmits a value, Parameter_Val_n (x octet) corresponding to Parameter_ID_n (4 octet) together with Parameter_ID_n (4 octet) in NCI_CORE_GET_CONFIG_EVENT. The controller 200 may also transmit length information in NCI_CORE_GET_CONFIG_EVENT.

The host 100 may use NCI_CORE_SET_CONFIG_CMD to set configurations for the controller 200. In other words, to apply the parameters, the host 100 may transmit the command along with an appropriate "Parameter_ID" and parameter values that the host 100 wants to set in the controller 200. A response to NCI_CORE_SET_CONFIG_CMD conies in the form of NCI_CORE_SET_CONFIG_EVENT. In other words, upon successful reception and execution, the controller 200 may transmit the event along with an appropriate "Parameter ID" and current values set in the controller 200 as requested by the host 100.

For example, as illustrated in FIG. 7. when the host 100 transmits a parameter Parameter_ID_1 (4 octet) and Parameter_Val_1 (x octet) in NCI_CORE_SET_CONFIG_CMD to the controller 200, the controller 200 sets Parameter_Val_1 (x octet) as a value corresponding to Parameter_ID_1 (4 octet). If the host 100 transmits a parameter Parameter_ID_n (4 octet) and Parameter_Val_n (x octet) in NCI_CORE_SET_CONFIG_CMD to the controller 200, the controller 200 sets Parameter_Val_n (x octet) as a value corresponding to Parameter_ID_n (4 octet).

Besides, when NCI_CORE_CLEAR_CMD (not shown) is transmitted and received between the host 100 and the controller 200, all parameters set in the controller 200 may be set to default values which are initial values set during system setting.

Transaction Identifier may be used in the manner described with reference to. FIG. 5. Status provides information indicating the status of a message or parameter of the host 100 or the controller 200 and may have values listed in FIG. 8.

While the exemplary embodiments of the present invention have been described above in the context of the controller 200 being a command receiver, they are also applicable to the case where the controller 200 generates a command and transmits the command with parameters to the host 100.

Various embodiments have been described in the best mode for carrying out the invention.

The above embodiments are provided by combining components and features of the present invention in specific forms. The components or features of the present invention should be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

Those skilled in the art will appreciate that the present invention may be embodied in other specific forms than those set forth herein without departing from the spirit and essential characteristics. of the present invention. The above description is therefore to he construed in all aspects as illustrative and not restrictive. The scope of the invention should be determined by reasonable interpretation of the appended claims and all changes coming within the equivalency range of the invention are intended to be embraced in the scope of the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of controlling at least one message including at least one command and response, the method comprising:
   transmitting a reset command to reset a receiver,
   wherein a parameter of the receiver is reset to a default value based on the reset command;
   transmitting a set command including parameter information to the receiver for setting a parameter of the receiver with a target value; and
   receiving a set command response including first status information in response to the set command,
   wherein the first status information indicates whether a parameter requested by the set command is set to a target value or not, and
   wherein if the parameter requested by the set command is set to a target value, the first status information indicates a field of STATUS_OK. and if the parameter requested by the set command is not set to a target value, the first status information indicates a field of STATUS_IN VALID_PARAM.

2. The method of claim 1, further comprising:
   receiving a reset command response corresponding to the reset command,
   wherein the reset command response informs that the receiver has been reset.

3. The method of claim 2,
   wherein the reset command response includes second status information, the second status information indicating whether the parameter of the receiver is reset or not.

4. The method of claim 2, further comprising:
   initializing the receiver after the reset.

5. An apparatus for controlling at least one message including at least one command and response corresponding to the at least one command, the apparatus comprising:
   a processor configured to
      transmit a reset command to reset a receiver,
      transmit a set command including parameter information to the receiver for setting a parameter of the receiver with a target value, and
      receive a set command response including first status information in response to the set command,
   wherein a parameter of the receiver is reset to a default value based on the reset command,
   wherein the first status information indicates whether a parameter requested by the set command is set to a target value or not, and
   wherein if the parameter requested by the set command is set to a target value, the first status information indicates a field of STATUS_OK and if the parameter requested by the set command is not set to a target value, the first status information indicates a field of STATUS_INVALID_PARAM.

6. The apparatus of claim 5,
   wherein the processor further comprises receiving a reset command response corresponding to the reset command, and
   wherein the reset command response informs that the receiver has been reset.

7. The apparatus of claim 6,
   wherein the reset command response includes second status information, the second status information indicating whether the parameter of the receiver is reset or not.

8. The apparatus of claim 6,
   wherein the processor further comprises initializing the receiver after the reset.

* * * * *